United States Patent
Gui et al.

(10) Patent No.: US 6,445,543 B1
(45) Date of Patent: Sep. 3, 2002

(54) SLIDER WITH PRESSURE RELIEF TRENCHES

(75) Inventors: Jing Gui, Fremont; Bruno Jean Marchon, Palo Alto; Huan Tang, Cupertino, all of CA (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/761,348

(22) Filed: Jan. 16, 2001

Related U.S. Application Data

(62) Division of application No. 09/157,700, filed on Sep. 21, 1998, now Pat. No. 6,188,547.
(60) Provisional application No. 60/088,119, filed on Jun. 4, 1998.

(51) Int. Cl.[7] ................................................ G11B 5/60
(52) U.S. Cl. ..................................... 360/236.6; 360/237
(58) Field of Search ............................... 360/236.6, 237

(56) References Cited

U.S. PATENT DOCUMENTS

| | | | |
|---|---|---|---|
| 4,212,044 A | 7/1980 | Plotto | 360/103 |
| 4,553,184 A | 11/1985 | Ogishima | 360/103 |
| 4,636,894 A | 1/1987 | Mo | 360/103 |
| 4,646,180 A | 2/1987 | Ohtsubo | 360/103 |
| 4,757,402 A | 7/1988 | Mo | 360/103 |
| 4,802,042 A | 1/1989 | Strom | 360/103 |
| 4,961,121 A | 10/1990 | Astheimer et al. | 360/103 |
| 5,086,360 A * | 2/1992 | Smith et al. | 360/103 |
| 5,200,868 A | 4/1993 | Chapin et al. | 360/103 |
| 5,345,353 A | 9/1994 | Krantz et al. | 360/103 |
| 5,572,386 A | 11/1996 | Ananth et al. | 360/103 |
| 5,742,518 A | 4/1998 | Gui et al. | 364/508 |
| 5,751,517 A | 5/1998 | Agarwal | 360/103 |
| 5,841,608 A | 11/1998 | Kasamatsu et al. | 360/103 |
| 6,188,547 B1 * | 2/2001 | Gui et al. | 360/236.5 |

FOREIGN PATENT DOCUMENTS

| | | |
|---|---|---|
| JP | 61-204877 | 9/1986 |
| JP | 63-231775 | 9/1988 |
| JP | 1-116957 | 5/1989 |
| JP | 1-227215 | 9/1989 |

OTHER PUBLICATIONS

"A stiction Model for a Head–Disk Interface of a Rigid Disk Drive", by J. Gui et al., *J. Appl. Phys.*, 78(6), pp. 4206–4217, Sep. 1995.

"Stiction Free Slider for the Smooth Surface Disk" by Y. Kasamatsu et al., *IEEE Transactions on Magnetics*, vol. 31, No. 6, pp. 2961–2963, Nov. 1995.

\* cited by examiner

*Primary Examiner*—Robert S. Tupper
(74) *Attorney, Agent, or Firm*—Westman, Champlin & Kelly

(57) ABSTRACT

A slider for supporting transducer elements for a data storage system including at least one pressure relief trench formed in the raised bearing proximate to a contact interface position of the slider and disc surface. The trench is sized to reduce capillary pressure of the meniscus relative to disjoining pressure of a lubricant film layer on the disc surface to limit the area or expansion of a film bridge or meniscus between the bearing surface of the slider and disc surface.

14 Claims, 18 Drawing Sheets

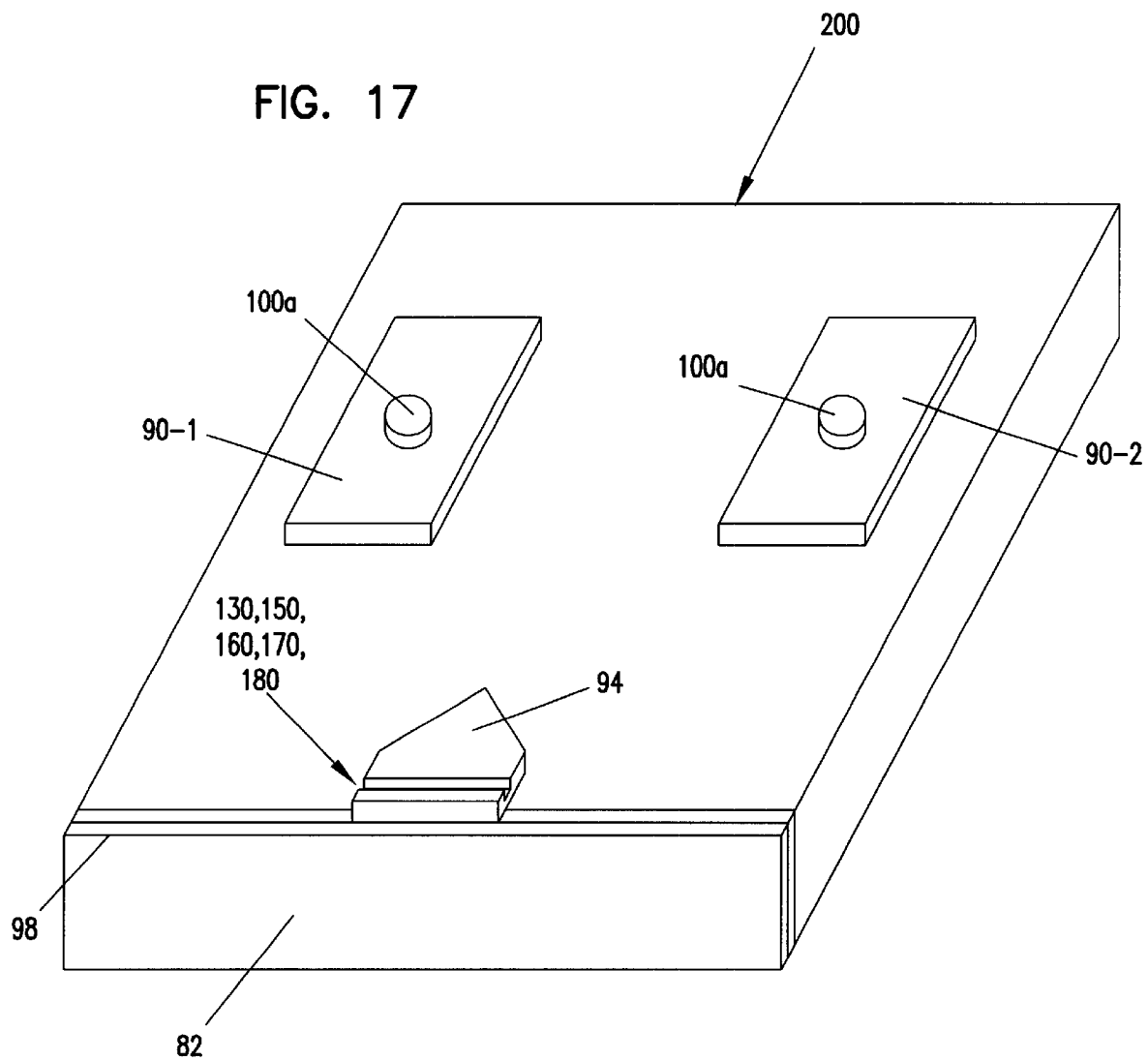

SLIDER WITH PRESSURE RELIEF TRENCHES

CROSS-REFERENCE TO RELATED APPLICATION

This application is a divisional application of U.S. patent application Ser. No. 09/157,700, filed Sep. 21, 1998 which U.S. Pat. No. 6,188,547 claims priority to Provisional Application Ser. No. 60/088,119, filed Jun. 4, 1998, and entitled "PRESSURE-PELIEF TRENCHES FOR SLIP HEADS TO REDUCE STICTION."

BACKGROUND OF THE INVENTION

The present invention relates to a data storage system. In particular, the present invention relates to a slider with improved meniscus stiction control.

Disc drives are well known in the industry. Such drives use rigid discs coated with a magnetizable medium for storage of digital information in a plurality of concentric data tracks. Typically, disc drives include a disc pack including a plurality of concentric discs mounted on a spindle motor which causes the discs to spin. Heads carrying transducer elements are supported relative to the disc surfaces to read and or write digital information to the disc surfaces.

Heads include a slider supported via a suspension assembly coupled to an actuator or "E" block. Sliders include an air bearing surface which faces the disc surface. As the disc rotates, the disc drags air onto the slider along the air bearing surface in a direction approximately parallel to the tangential velocity of the disc. As the air passes beneath the air bearing surface, the pressure between the disc and the air bearing surface increases, which creates a hydrodynamic lifting force that causes the slider to lift directly above the disc surface to read and/or write data to the surface of the disc.

Prior to rotation of the disc, the slider rests on the disc surface. The slider is not lifted from the disc until the hydrodynamic lifting force, caused by rotation of the disc, is sufficient to overcome a preload force supplied to bias the slider toward the disc surface, and a stiction force holding the slider to the disc surface. The hydrodynamic properties of the slider are affected by the speed of rotation of the disc, the design of the air bearing surface of the slider, and the preload force supplied to the slider via the suspension assembly.

Typically a lubricant coating covers the disc surface to protect the slider and disc from wear during contact starts and stops (CSS). Contact between the slider and disc surface (and lubricant coating) creates a meniscus effect which increases stiction force between the slider and disc surface. When a disc drive is turned on, the spindle motor produces torque to overcome stiction and initiate "spin-up". Stiction increases the motor torque required to spin-up the disc drive. If stiction is too large for motor torque to overcome, spin-up failure could occur.

Prior disc drives include both landing zones and data zones on the disc surface. The slider rests on the landing zone for CSS. The landing zone is textured to provide a roughened surface structure for reducing stiction between the slider and disc surface for take-off. However, the textured surface of the landing zone limits the fly-height of the slider. The present invention relates to these and other problems.

SUMMARY OF THE INVENTION

The present invention relates to a slider for supporting transducer elements for a data storage system including at least one pressure relief trench formed in the raised bearing surface proximate to a contact interface position between the slider and disc surface. The trench is sized to reduce capillary pressure of the meniscus relative to the disjoining pressure of a lubricant film layer on the disc surface to limit the area or expansion of a film bridge or meniscus between the bearing surface of the slider and disc surface.

BRIEF DESCRIPTION OF THE DRAWINGS

FIGS. 7-1–7-4 are illustrative views of various wetting regimes of a slider-disc interface.

FIG. 17 is a perspective view of an embodiment of a slider for pseudo-contact recording.

DETAILED DESCRIPTION OF THE PREFERRED EMBODIMENTS

Figure 1:
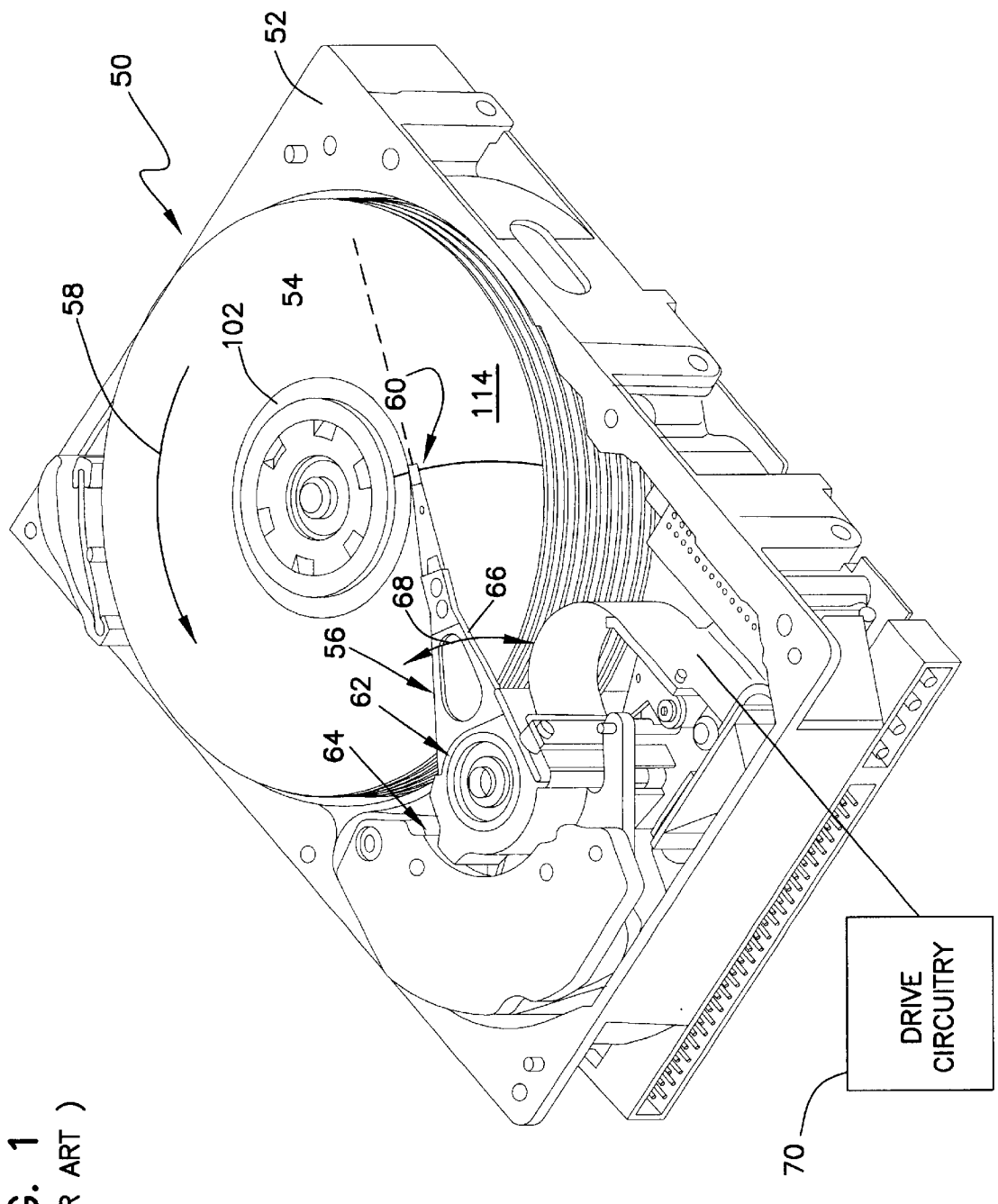
FIG. 1 is a perspective view of an embodiment of a data storage system.

FIG. 1. illustrates a disc drive 50 including a chassis 52, discs 54, and actuator assembly 56. Discs 54 are rotationally coupled to chassis 52 via a spindle motor (not shown) for rotation, as illustrated by arrow 58. Actuator assembly 56 rotationally supports heads 60 for reading and/or writing data to and from discs 54. The actuator assembly includes actuator block 62 and voice coil motor (VCM) 64. As shown, actuator block 62 is rotationally coupled to chassis 52. The actuator block 62 includes a plurality of actuator arms 66 (only one shown in FIG. 1) to support heads 60 relative to the disc surface. The actuator block rotates as illustrated by arrow 68 to move heads 60 along an arcuate path for placement relative to data tracks of a disc 54 to read or write data relative to the disc surface. Movement of the actuator block 62 is controlled by voice coil motor 64, which is coupled to control circuitry of the disc drive illustrated by block 70.

Figure 2:
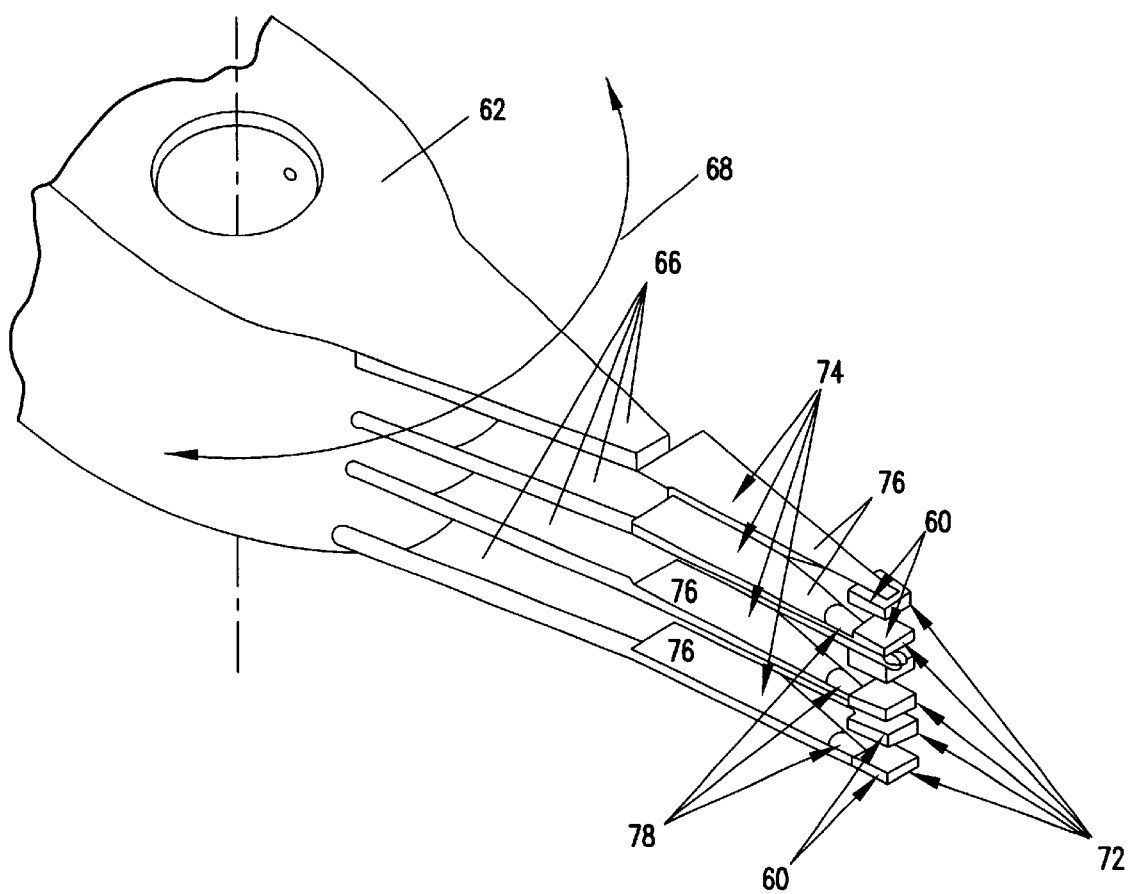
FIG. 2 is a perspective view of an embodiment of an actuator block supporting disc heads.
Figure 3:
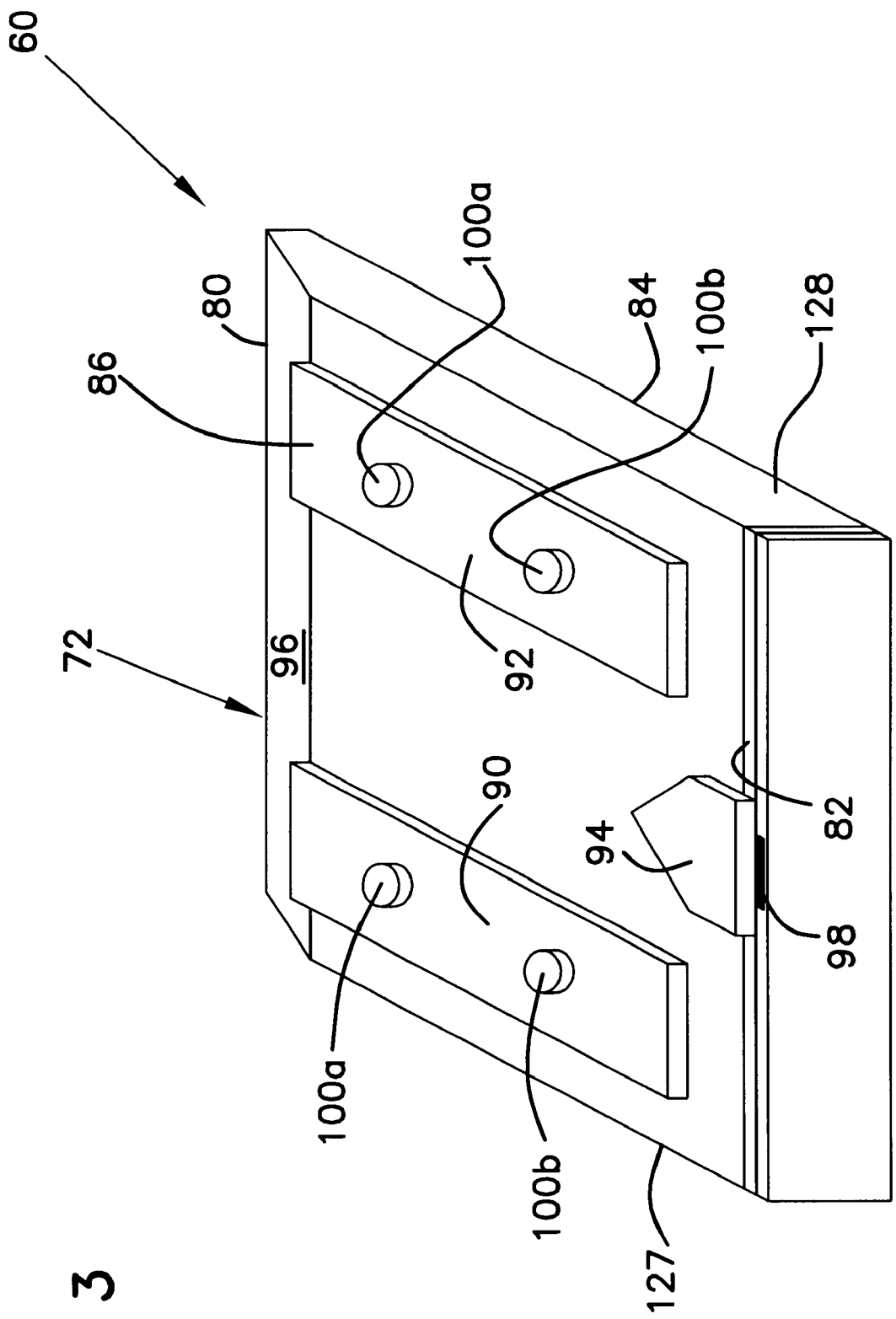
FIG. 3 is a perspective view of an embodiment of a slider supporting transducers.

As shown in FIG. 2, heads 60 include a slider 72 which supports transducer elements for read and write operations. Slider 72 is coupled to actuator block 62 via a suspension assembly 74 coupled to actuator arms 66. As shown in FIG. 2, suspension assembly 74 includes a load beam 76 and a gimbal spring 78. Gimbal spring 78 supports slider 72 to pitch, roll and follow the topography of the disc in a known manner. FIG. 3 illustrates one embodiment of a slider 72 formed of a rigid member including a leading edge 80, a trailing edge 82, an upper surface 84, and a lower air bearing surface 86. The upper surface 84 is operably coupled to gimbal spring 78 shown in FIG. 2 to flexibly support slider 72. Load beam 76 supplies a preload force to bias the slider 72 toward the disc surface 54.

The lower air bearing surface 86 of the slider 72 faces the disc surface and includes raised side rails 90 and 92, and a center rail 94. Slider 72 includes a sloped leading surface 96 for "take-off". Center rail supports transducer 98 (illustrated diagrammatically) for read or write operations. Transducers may be inductive type transducers or magnetoresistive transducers. Discs 54 are rotated to create a hydrodynamic lifting force to lift the head 60 (slider 72) above the disc surface for proximity recording. Although a particular bearing surface is shown, it should be understood that alternate bearing designs may be used and application is not limited to a particular bearing design.

Prior to operation, the slider 72 is parked on the disc surface for contact starts and stops ("CSS"). The disc surface 54 includes a lubricant coating to limit wear of the slider and disc during CSS. Interface between the slider and lubricant creates a meniscus effect which increases the stiction between the slider and disc surface. Increase in stiction in the presence of a liquid lubricant is a direct result of the meniscus effect of the lubricant. The influence of the meniscus is related to the thickness of the lubricant coating and contact interface and separation between the slider and disc surface. Prior discs have separate textured landing zones to park the slider prior to operation to limit stiction between the slider and disc surface.

Figure 4:
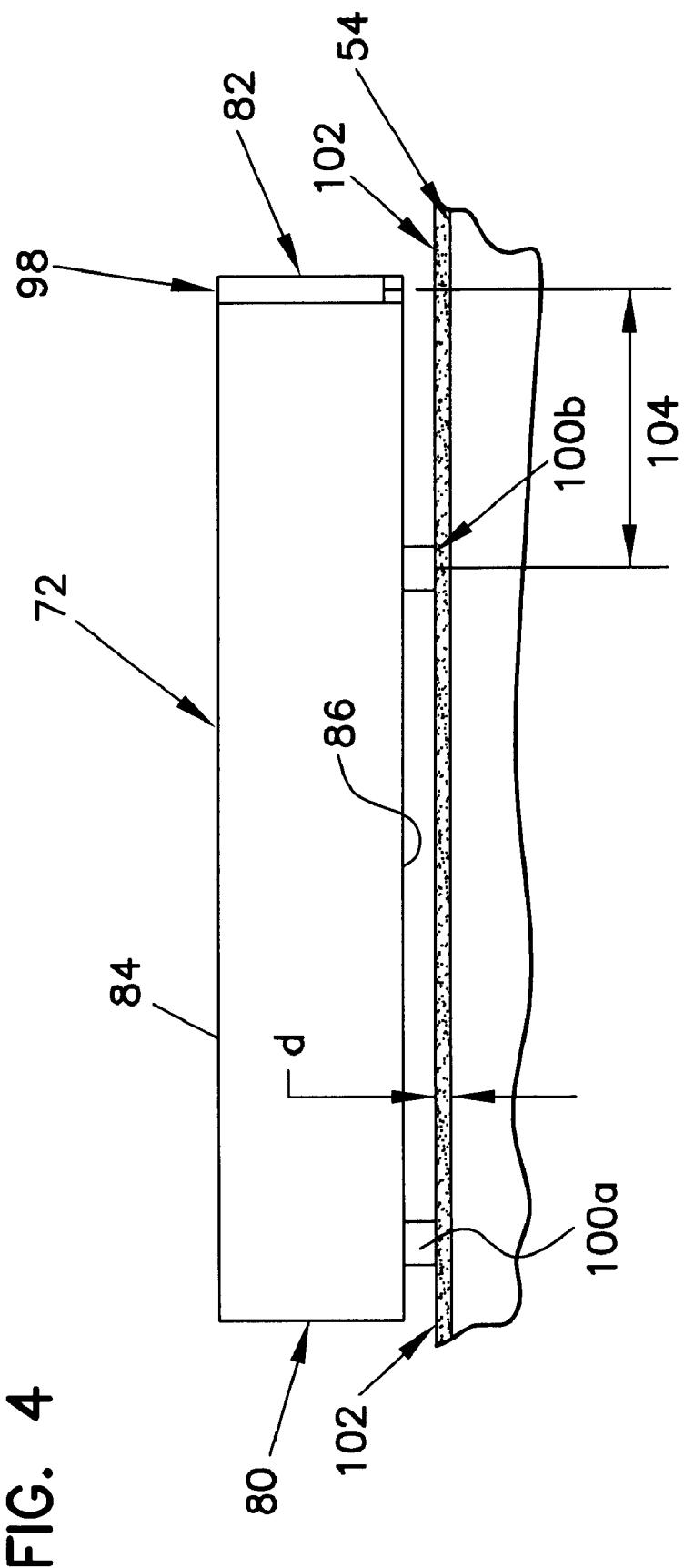
FIG. 4 is a side illustrative view of the slider of FIG. 3 supported on a lubricant film layer on the disc surface.

In the present application, the slider includes pads 100a–100b or SLIP (Slider Landing Integrated Pad) extending from the bearing surface to support the slider above the disc surface for contact starts and stops as illustrated in FIGS. 3–4. In the embodiment illustrated, landing pads 100a, 100b extend from, or are elevated above the bearing surface 86 proximate to the leading and trailing ends 80, 82, respectively to support the slider 72 above the disc surface 54 for CSS.

In operation, rotation of the discs 54 creates a fluid or air flow under the bearing surface from the leading edge surface 96 to raise the slider 72 above the disc surface for proximity recording. Sufficient lift must be imparted to the bearing surface 86 to overcome the stiction holding the slider 72 to the disc surface and the preload force supplied by the suspension assembly 74. As previously explained, for operation or "take-off", the motor torque of the spindle motor must overcome the stiction force holding the slider to the disc surface. Stiction force $F_s$ is proportional to the preload force $F_1$ and the meniscus force $F_m$ as follows:

$$F_s = \mu(F_m + F_1) \qquad \text{Eq. 1}$$

where:

$F_m$—is the meniscus force created by the interface of the lubricant film and the slider; and $F_1$—is the pre-load force supplied to the slider by the suspension assembly to bias the slider toward the disc surface.

Pads are adapted to support slider 72 above a relatively smooth disc surface coated with a lubricant film layer 102 as illustrated in FIG. 4 to reduce stiction between the slider and disc surface for CSS.

Figure 5:
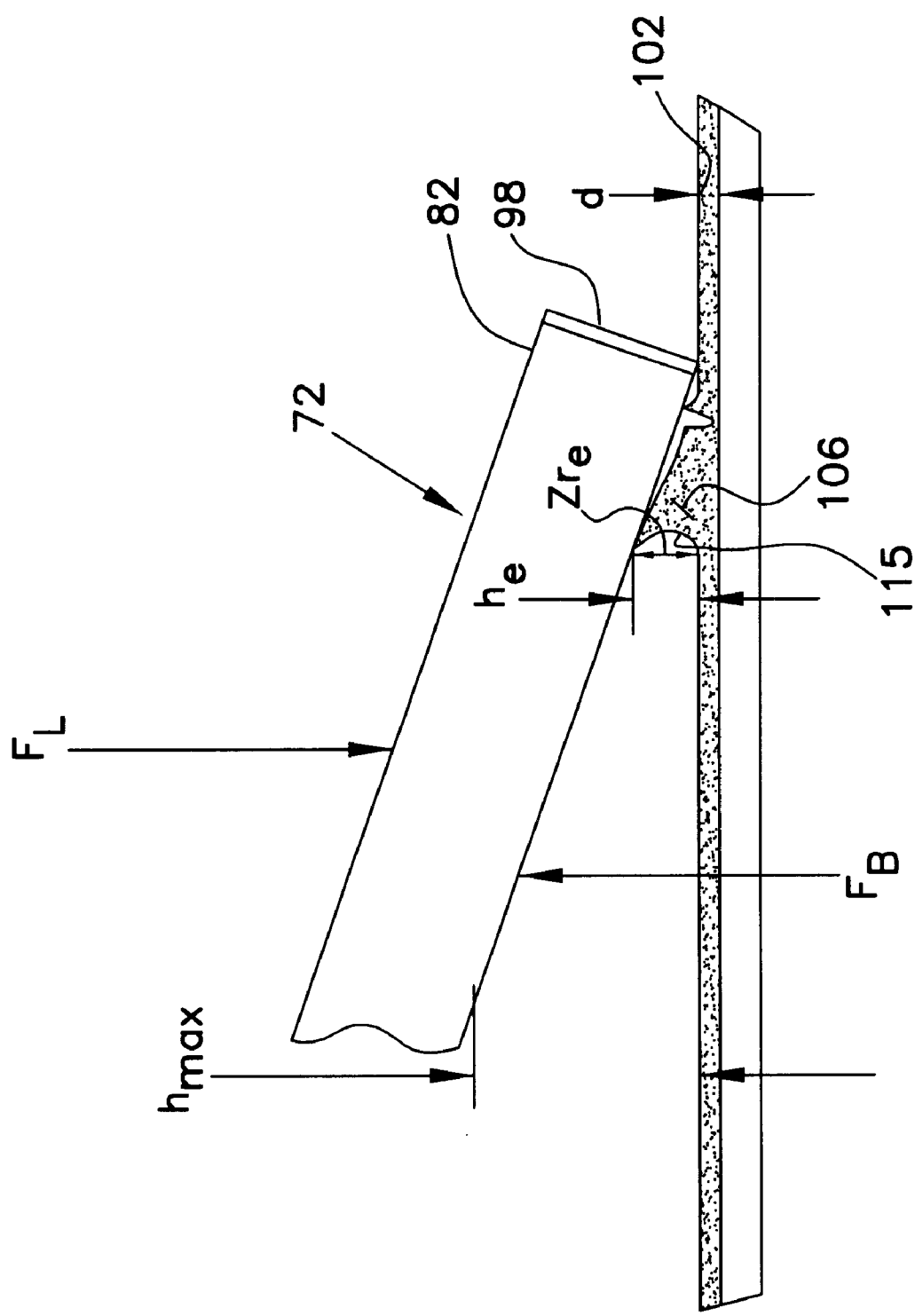
FIG. 5 is a side illustrative view of a trailing edge portion of a slider tipped toward the disc surface.

Sliders typically fly above the disc surface at a pitch angle so that the trailing edge 82 supporting the transducer elements flies closer to the disc surface than the leading edge 80. Areal disc drive density is increasing and slider fly height is decreasing for desired read or write resolution. As shown in FIG. 4, pads 100b are recessed a distance 104 from the transducer 98 and trailing edge to limit contact interference between the pad 100b and the disc surface. The recessed position of pad 100b (or absence of pad 100b at the trailing edge 82) increases the propensity of the slider to tip so that trailing edge contacts or touches the lubricant film 102 on the disc surface as illustrated in FIG. 5.

Figure 6:
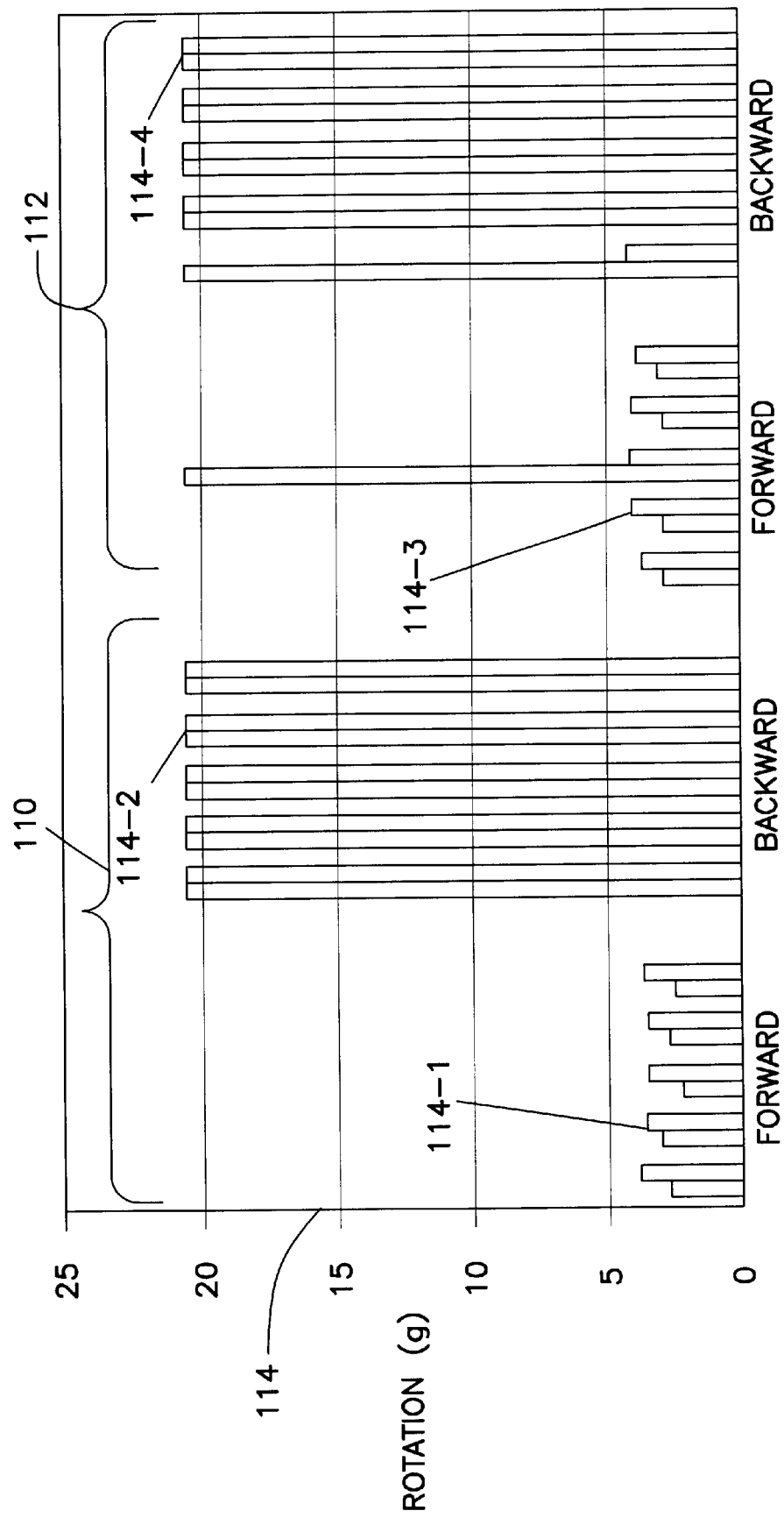
FIG. 6 is a graphical illustration of stiction force of two sample sliders subjected to a forward and a reverse or backward rotation.

In particular, as shown, a trailing edge portion of the slider 72 spaced from pad 100b (not shown) tips toward the disc surface to contact the lubricant film layer 102. Interface between the slider surface and lubricant film layer 102 creates meniscus 106 between the lubricant film layer 102 and slider 72. Interaction between the slider 72 and the lubricant film layer 102 is confirmed experimentally in FIG. 6. FIG. 6 shows the experimental results of two test sliders 110, 112 each subjected to a manual rotation in the forward direction (from the leading edge to the trailing edge) and backward direction (from the trailing edge to the leading edge prior to stiction measurement. The sliders 110, 112 include recessed pads 100b having a recessed dimension 104 of 13 mils. The sliders 110, 112 were tested on two smooth discs having a Ra (Roughness Average) of 7 Angstroms and a lubricant film layer thickness 102 of 30 Angstroms.

The stiction force 114 of the slider 110, 112 relative to the disc surface was measured for each rotation direction. As shown, the stiction 114-1 for slider 110 in the forward rotation direction was significantly less than the stiction 114-2 measured in the backward rotation direction. Similarly, the stiction force 114-3 for slider 112 in the forward direction was significantly less than the stiction force 114-4 measured in the backward rotation direction. The large discrepency in stiction is attributed to an increase meniscus 106 introduced by the slider tipping as illustrated in FIG. 5 when the slider was subjected to a backward rotation direction of the disc prior to stiction measurement so that the friction force drives the slider towards tipping.

To form the menisci, the lubricant is dragged from the contact area between the slider and disc surface along the surface of the slider (herein capillary surface), via capillary pressure. The lubricant film is dragged so that the effect of the meniscus expands, while the attractive force between lubricant molecules and the solid surface, which is quantitatively represented by the disjoining pressure of the lubricant film, is overcome by the driving force of the capillary pressure of the meniscus. The magnitude meniscus force $F_m$ and stiction for the slider is proportional to the area of the meniscus. In particular stiction force $F_s$ (in grams-force gf) may be estimated as follows:

$$F_s \approx 0.0005 \, A \qquad \text{Eq. 2}$$

where:

A is the area of the meniscus in micron$^2$.

For example, every 2,000 $\mu m^2$ of meniscus creates 1 gf of stiction. Thus, in the embodiment of the slider 72 illustrated in FIGS. 3–4, the center rail 94 is approximately 70,000 $\mu m^2$ and thus if half the center rail is flooded an estimated stiction force is approximately 17.5 gf. The increase stiction force as illustrated above affects operation of the disc drive.

As the lubricant film is thinned, it is more and more difficult for a meniscus to draw lubricant from its surrounding area to spread. Eventually, a (quasi) equilibrium state is reached where the disjoining pressure of the film equals the capillary pressure of the meniscus as follows:

$$\frac{A_H}{6\pi d^3} = \frac{\gamma}{R_e} \quad \text{Eq. 3}$$

where:
- $A_H$ is the Hamaker constant
- $\gamma$—is surface tension of the lubricant;
- $R_e$—is the radius of the leading edge 115 of the meniscus formed between the disc and capillary surface of the slider.
- d—is the thickness of the lubricant film.

The Hamaker constant $A_H$ is $\sim 10^{-19}$ Joules for most PFPE lubricants on carbon. The surface tension for Zdol and other PFPE lubricants is approximately ~25 mN\m. For the tipped slider illustrated in FIG. 5, the equilibrium condition is related to the thickness d- of the lubricant film layer 102 and the geometry or interface between the tipped slider 72 and disc surface. In the embodiment illustrated in FIG. 5, the separation distance h increases from the trailing edge contact position along the length of the slider 72. The radius of the meniscus 106 is the separation distance h/2 between the slider 72 and disc surface at the leading edge 115 of the meniscus 106.

Figures 1, 7:
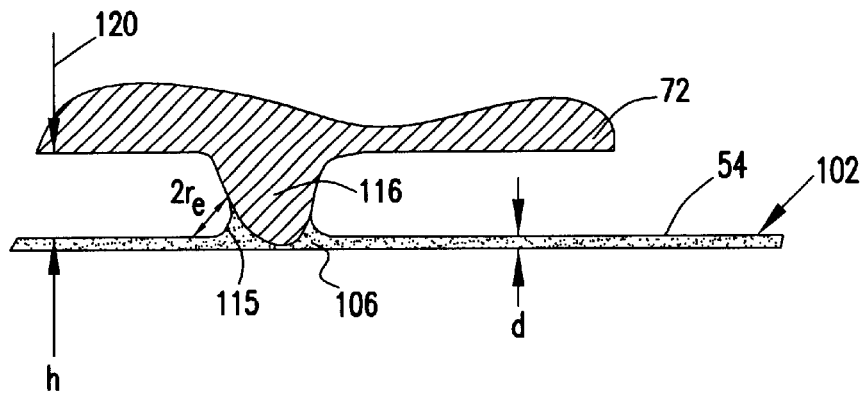
Figures 2, 7:
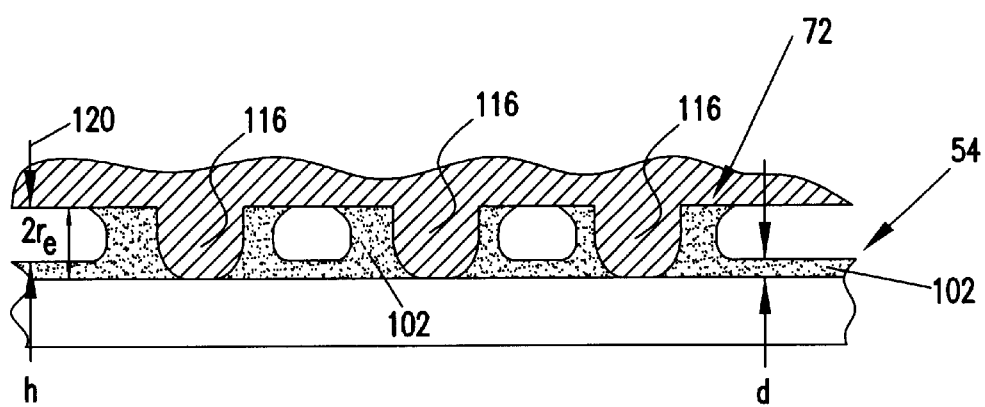
Figures 3, 7:
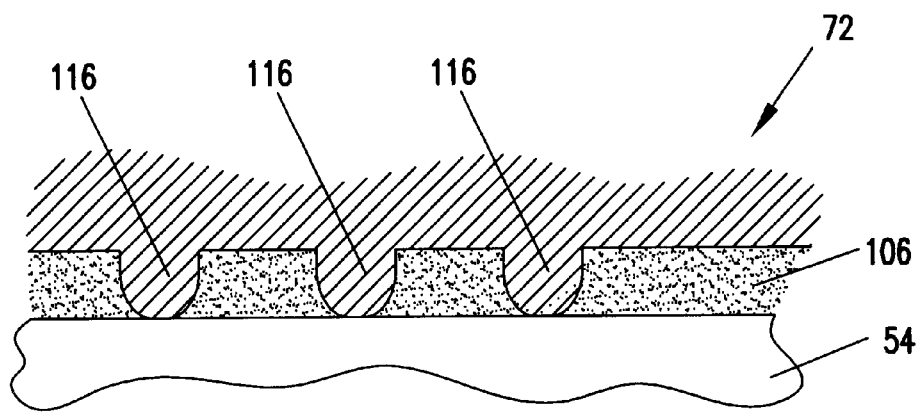
Figures 4, 7:
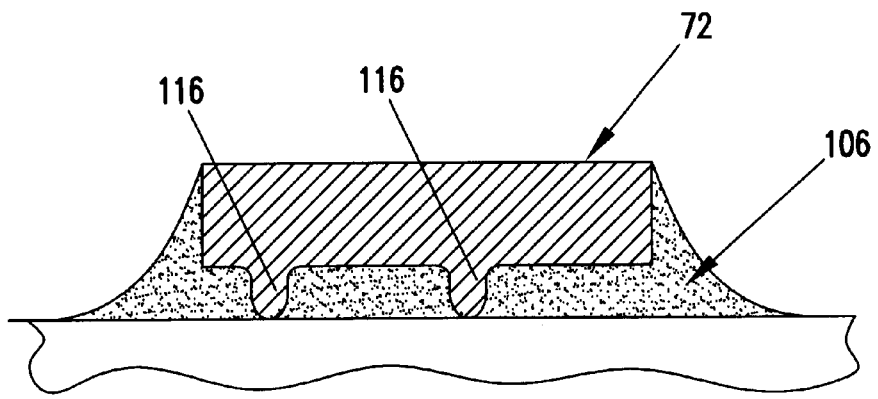

FIG. 7-1–FIG. 7-4 illustrate different wetting regimes for a head-disc contact interface with respect to bumps 116. FIG. 7-1 is referred to as a toe-dipping regime. FIG. 7-2 is referred to as a pillbox regime. FIG. 7-3 is referred to as a flooded regime and FIG. 7-4 is referred to as the immersed regime. The toe-dipping regime provides the least stiction and the flooded regime introduces the highest stiction since the surface area interface of the meniscus and the slider increases from the toe-dipping regime to the immersed regime. Thus, it is desirable to provide a contact interface between the disc and slider in the toe-dipping regime to control stiction.

In particular, in the toe-dipping regime, illustrated in FIG. 7-1, bumps 116 contact lubricant film 102 developing a meniscus 106 at the interface between the bump 116 and lubricant film 102. The meniscus 106 expands until radius $R_e$ of the meniscus is at equilibrium as defined by Eq. 3. $2R_e$ at equilibrium is less than the separation distance 120 between the slider and the disc so that the meniscus area does not extend or spread between the slider 72 and the disc surface. In the pillbox regime illustrated in FIG. 7-2, $2R_e$ at equilibrium for lubricant thickness d is similar to the separation distance 120 of the head—disc. FIGS. 7-3 and 7-4 illustrate equilibrium positions where the meniscus film envelopes the separation between the disc and slider so that the slider is essentially glued to the disc surface by the lubricant film.

Figure 8:
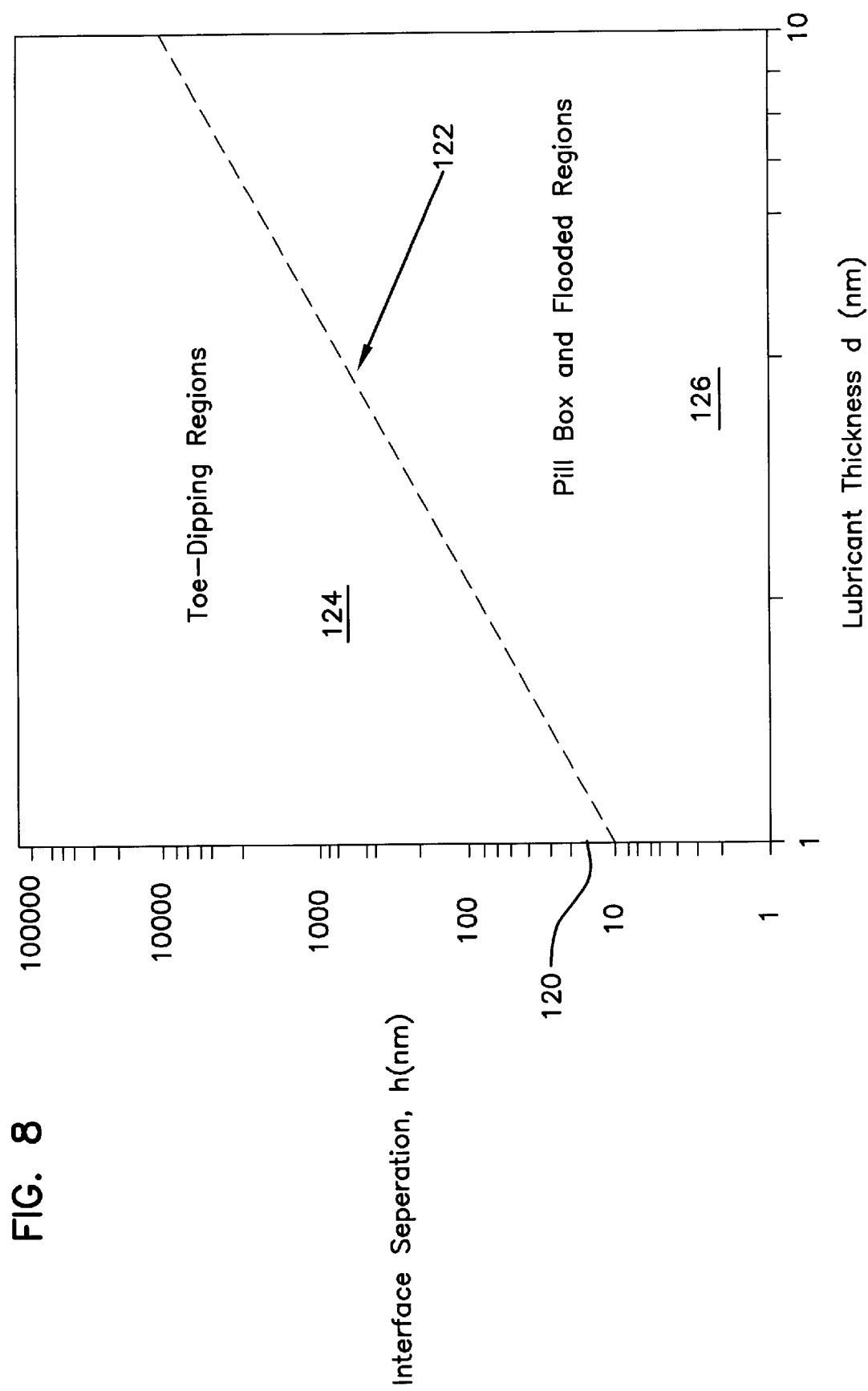
FIG. 8 graphically illustrates different slider—disc interface regimes.

FIG. 8 illustrates a graphical relation between the head—disc separation 120, lubricant thickness and meniscus equilibrium condition. Line 122 illustrates separation of the toe-dipping regime 124 and pillbox and flooded regimes 126 based upon lubricant thickness d and slider—disc separation 120. The meniscus expands depending upon the lubricant thickness and separation distance h (120) to an equilibrium in the toe-dipping regime 124 or pillbox or flooded regimes 126. As shown, for a greater lubricant thickness d, the greater the slider—disc separation 120 require to limit meniscus effect to the toe-dipping regime 124. To reduce meniscus size, lubricant thickness d may be decreased or slider disc separation 120 may be increased. However, operating requirements may limit parameter adjustments to control meniscus growth.

Figure 9:
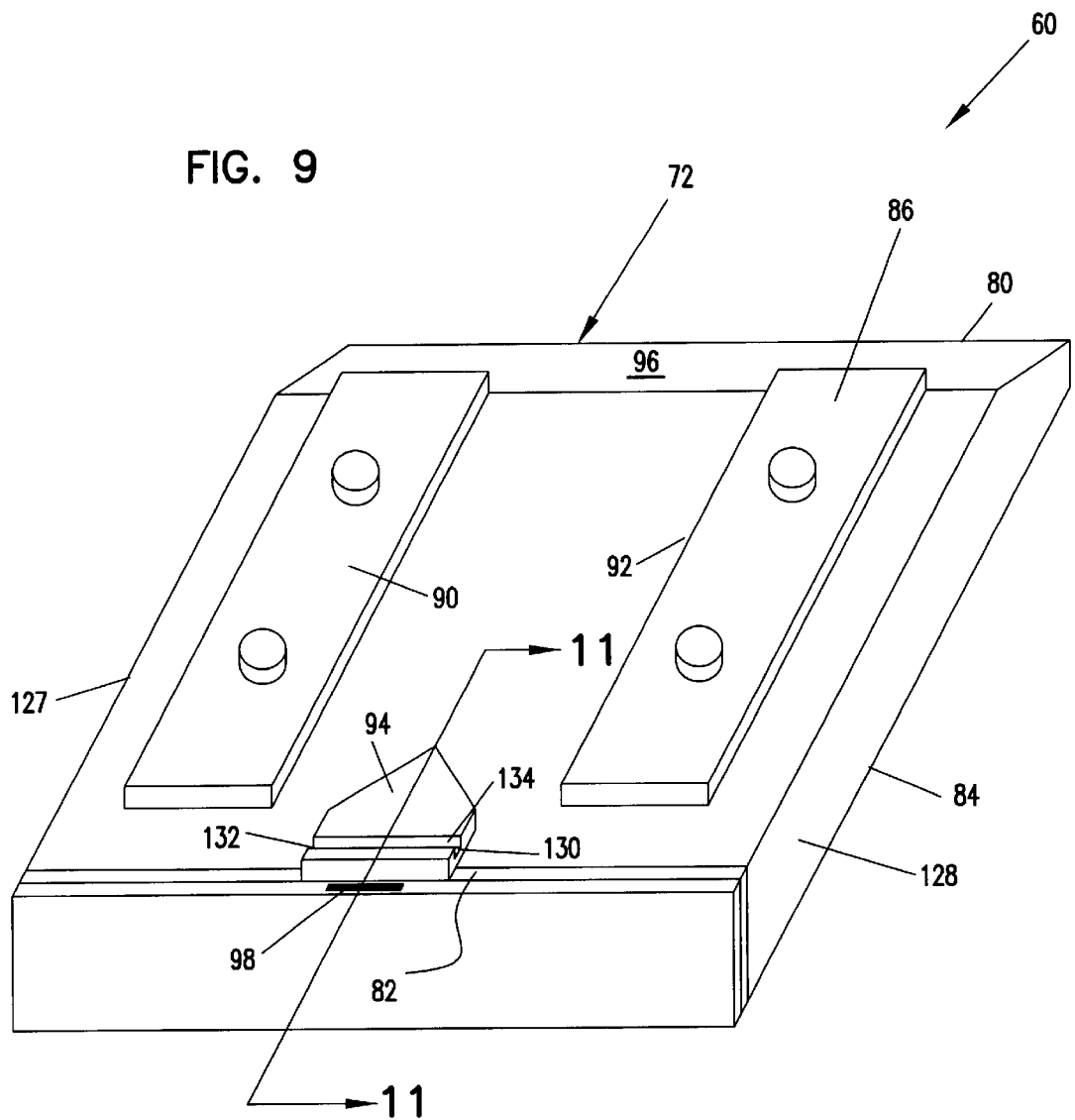
FIG. 9 is a perspective illustration of an embodiment of a slider according to the present invention.
Figure 10:
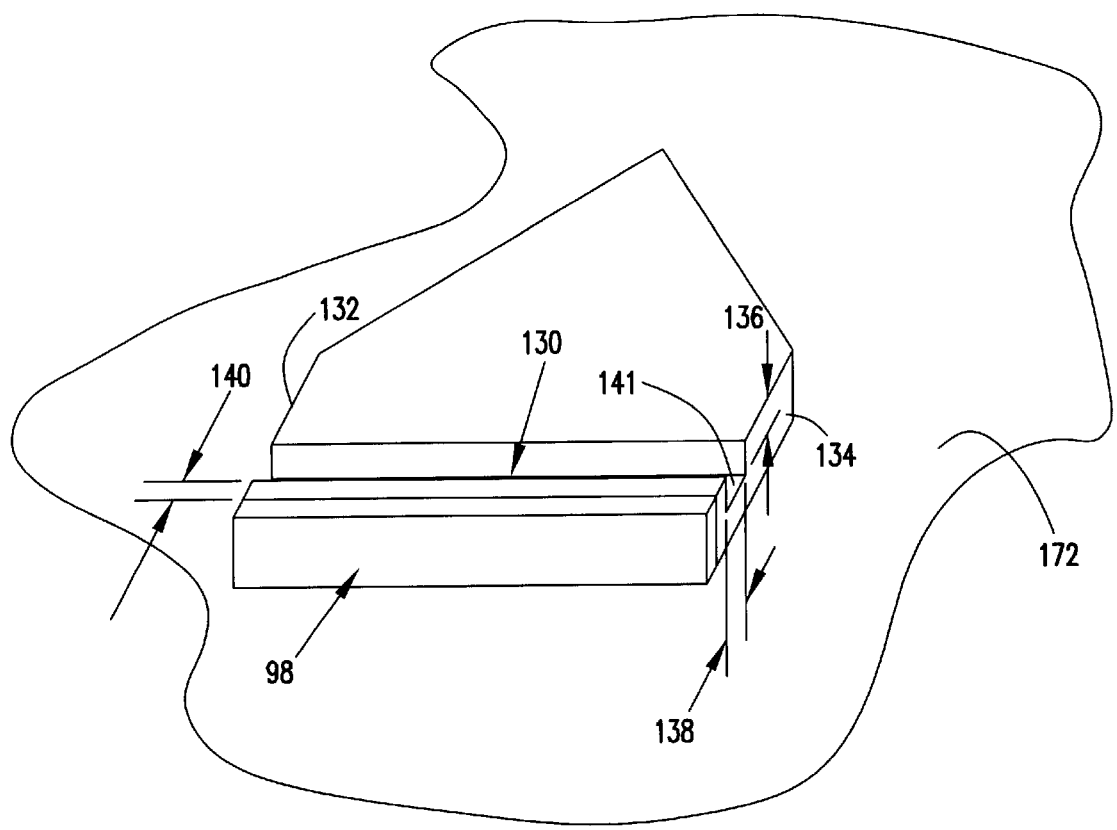
FIG. 10 is a detailed perspective illustration of a center rail portion of the slider of FIG. 9 including a trench.
Figure 11:
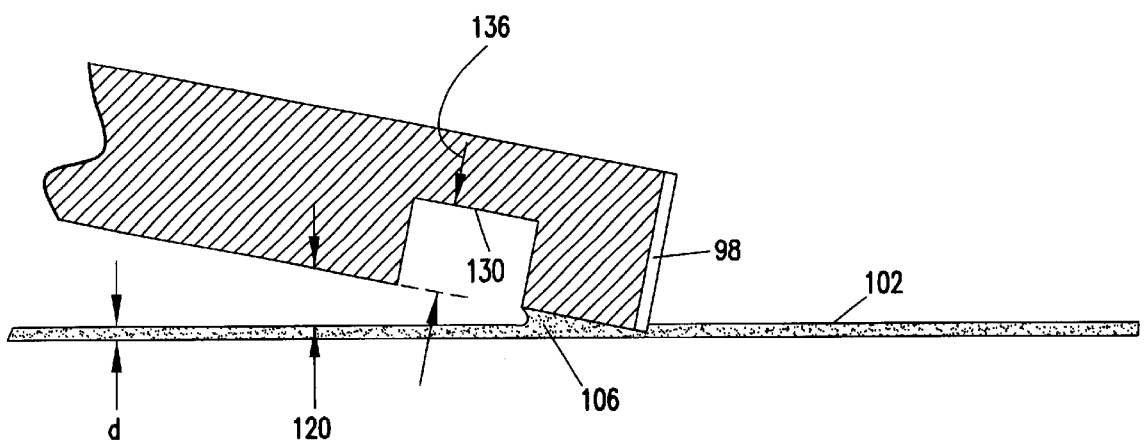
FIG. 11 is an illustrative view of a slider disc interface for cross-sectional portion 11—11 of FIG. 9.

The present invention provides a slider-disc interface to limit influence of the meniscus effect as illustrated in an embodiment of the invention shown in FIGS. 9–11. As shown in FIGS. 9–11, slider includes a longitudinal axis parallel to side 127, 128 of slider and a transverse axis generally perpendicular to the longitudinal axis. Slider 72 includes an elongated trench 130 formed in center rail 94, and positioned proximate to a slider—disc contact interface proximate to the trailing edge of the slider. In the embodiment shown, trench 130 is transversely aligned and the length of the trench extends between opposed sides 132, 134 of center rail 94 and is opened at opposed sides to define a through channel between sides 132, 134. Trench 130 is illustrated in more detail in FIGS. 10–11.

As illustrated, trench 130 has a depth 136 and thickness 138. The depth 136 and thickness 138 are designed to reduce the capillary pressure of the meniscus relative to the disjoining pressure of the film to limit expansion of the meniscus area. In particular, depth 136 and thickness 138 are designed so that the separation distance between the capillary surface and the lubricant film layer ($d_{120}+d_{136}$—i.e. disc head—separation 120+depth 136 of trench) is equal to or greater than $2R_e$ (i.e. $d_{120}+d_{136} \geq 2R_e$) to limit expansion of the meniscus beyond trench 130 and reduce capillary pressure to lower the meniscus force.

Preferably, the trench 130 is recessed a distance 140 from the transducer 98 of the slider 72. Distance 140 is relatively small to position the trench 130 close to the slider—disc interface to minimize stiction. Preferably, in an example embodiment, trenches 130 may have a depth 136 of 0.3 μm and a thickness 138 of 20 μm. The spaced distance 140 may be 10 μm from the transducer. The trench 130 may be formed by known manufacturing processes, such as known photolithography techniques. Although a square bottom surface 141 is shown, it should be understood, that the invention is not limited to the exact configuration shown and that the trench may have a rounded or "V" shaped (not shown) bottom surface 141.

Figure 12:
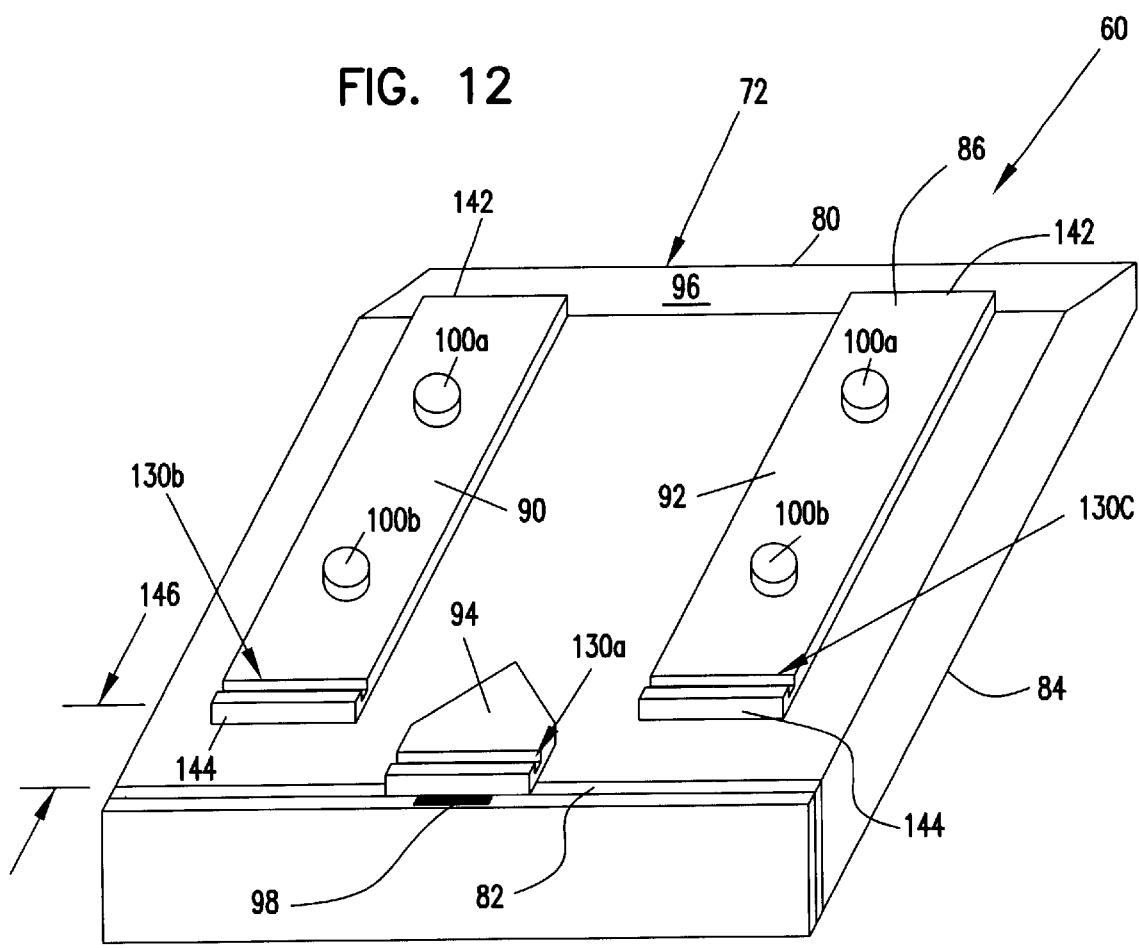
FIG. 12 is a perspective illustration of an alternate embodiment trench pattern on a slider of the present invention.

FIG. 12 illustrates an alternate slider embodiment including trenches 130a14c located on center rail 94, and side rails 90, 92, respectively. In particular side rails 90, 92 include first and second ends 142, 144. First end is aligned relative to the leading edge of the slider and the second end 144 is spaced a distance 146 from the trailing edge of the slider. Trenches 130b–c are located proximate to the second end 144 of rails 90, 92, respectively to limit meniscus effect proximate to the side rails 90, 92 toward the trailing edge of the slider 72. Trenches 130 a–c are similarly dimensioned as trench 130 illustrated in FIGS. 9–11. Trenches 130b–c are preferably located 5 μm from the second end 144 of rails 90, 92 and have a depth 136 of 0.3 μm and a thickness 138 of 20 μm.

Figure 13:
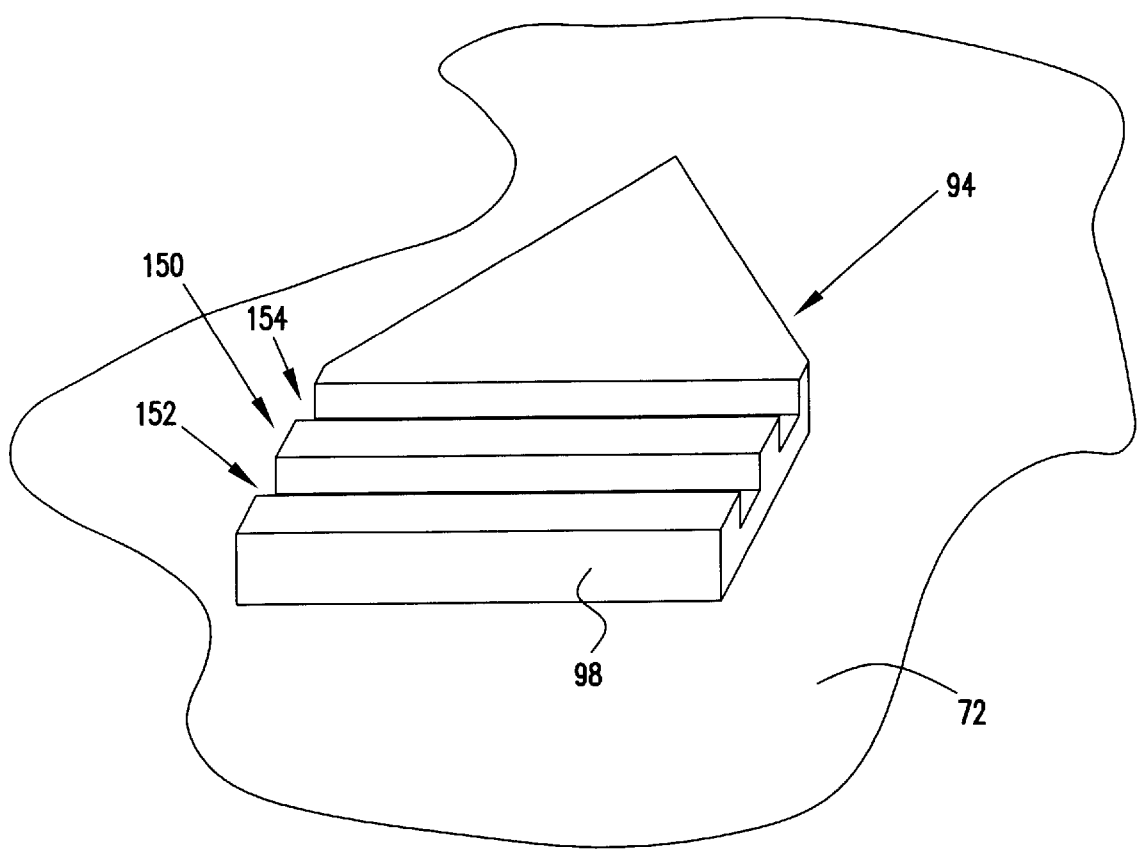
FIG. 13 is a detailed perspective illustration of an alternate embodiment trench pattern of the present invention.

FIGS. 13–16 illustrate alternate trench patterns for slowing meniscus growth by reducing the capillary pressure along the slider surface relative to the disjoining pressure of the lubricant film. FIG. 13 illustrates trench pattern 150 for slider 72. Trench pattern 150 includes a plurality of spaced transversely aligned elongated trenches 152, 154 (similar to trench 130) forming sequential rows of the trenches to form a line trench pattern. Although the trench pattern 150 is illustrated for center rail 94, trench pattern 150 may be included on side rails 90, 92 as described in relation to FIG. 12. Multiple transversely aligned, spaced trenches 152, 154 are included to collectively limit meniscus effect. In particular, the second trench 154 will slow the meniscus if the meniscus bridges the first trench 152. Although two trenches 152, 154 are shown, it should be understood that any number of trenches may be included.

Figure 14:
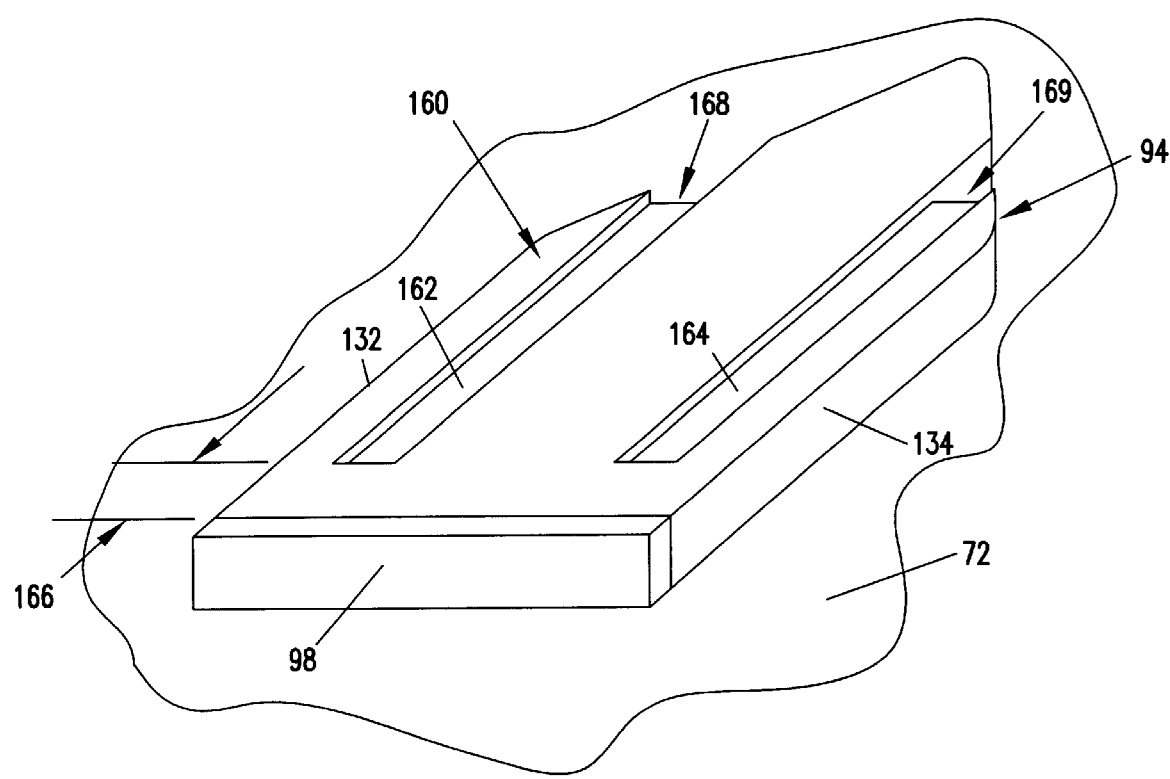
FIG. 14 is a detailed perspective illustration of an alternate embodiment trench pattern of the present invention.

FIG. 14 illustrates another trench pattern 160. Trench pattern 160 includes a plurality of spaced longitudinally aligned trenches 162, 164. Longitudinally aligned trenches 162, 164 are spaced a distance 166 from the transducer elements and are located between sides 132, 134. Preferably, the trenches are recessed 20 microns from the sensor. In the embodiment shown, trenches 162, 164 are opened at ends 168, 169 at a leading edge of the center rail 94.

Although a specific embodiment of longitudinal trenches 162, 164, is shown, the invention is not limited to the specific number, orientation, etc shown. The multiple longitudinal trenches 162, 164 provide multiple voids at the contact interface to slow meniscus growth. Although the trench pattern 160 is illustrated for center rail 94, trench pattern 160 may be included on side rails 90, 92 as described in relation to FIG. 12.

Figure 15:
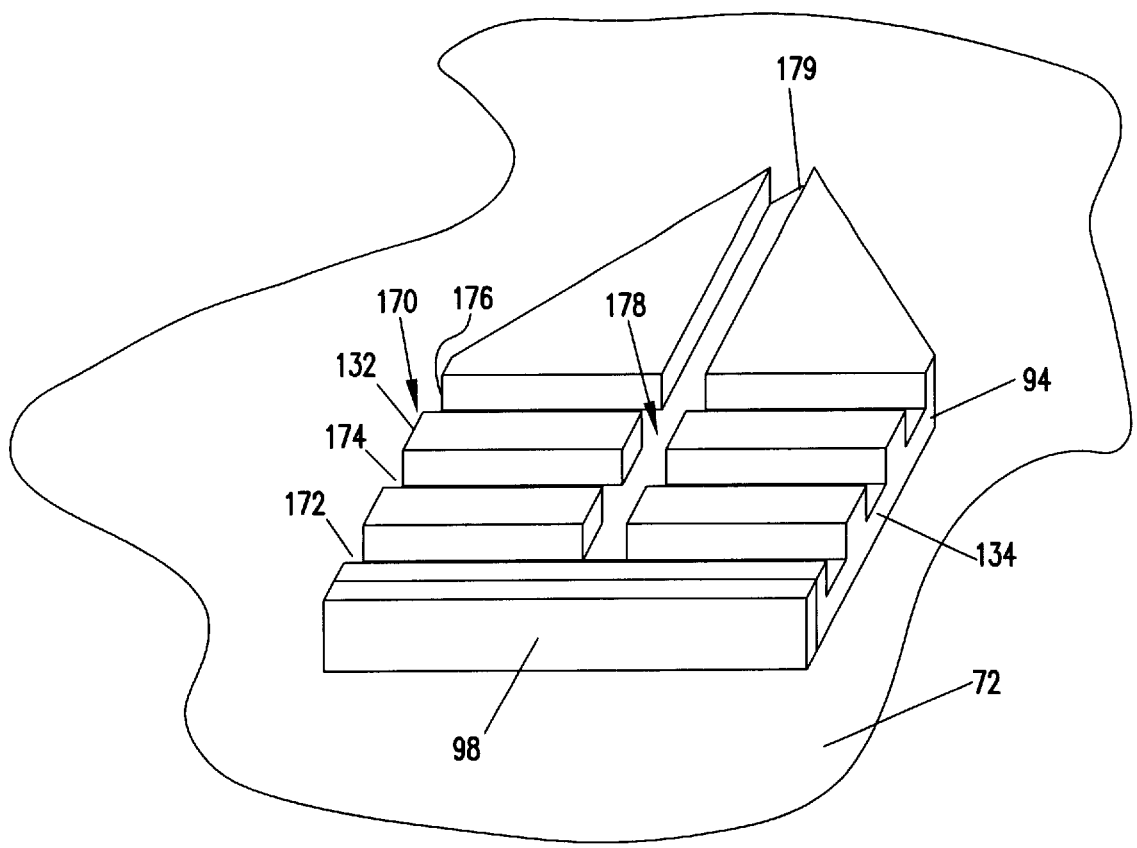
FIG. 15 is a detailed perspective illustration of an alternate embodiment trench pattern of the present invention.

FIG. 15 illustrates alternate trench pattern 170 including a plurality of spaced transverse trenches 172, 174, 176 and a longitudinal trench 178 to form a combination trench pattern. Spaced transverse trenches 172, 174, 176 are similar to trenches 152, 154 illustrated in FIG. 13. In the embodiment shown, longitudinal trench 178 extends from transverse trench 172 through trenches 174, 176 to an end 179 of the center rail spaced from the trailing edge and transducer 98. Preferably, as shown, transverse trenches 172, 174, 176 extend between opposed sides 132, 134 of center rail 94 and longitudinal trench 178 is generally centered relative to sides 132, 134. Although a particular number, orientation and arrangement of transverse and longitudinal trenches is shown, it should be understood that the invention is not limited to the specific embodiment shown, and is not limited to center rail 94.

Figure 16:
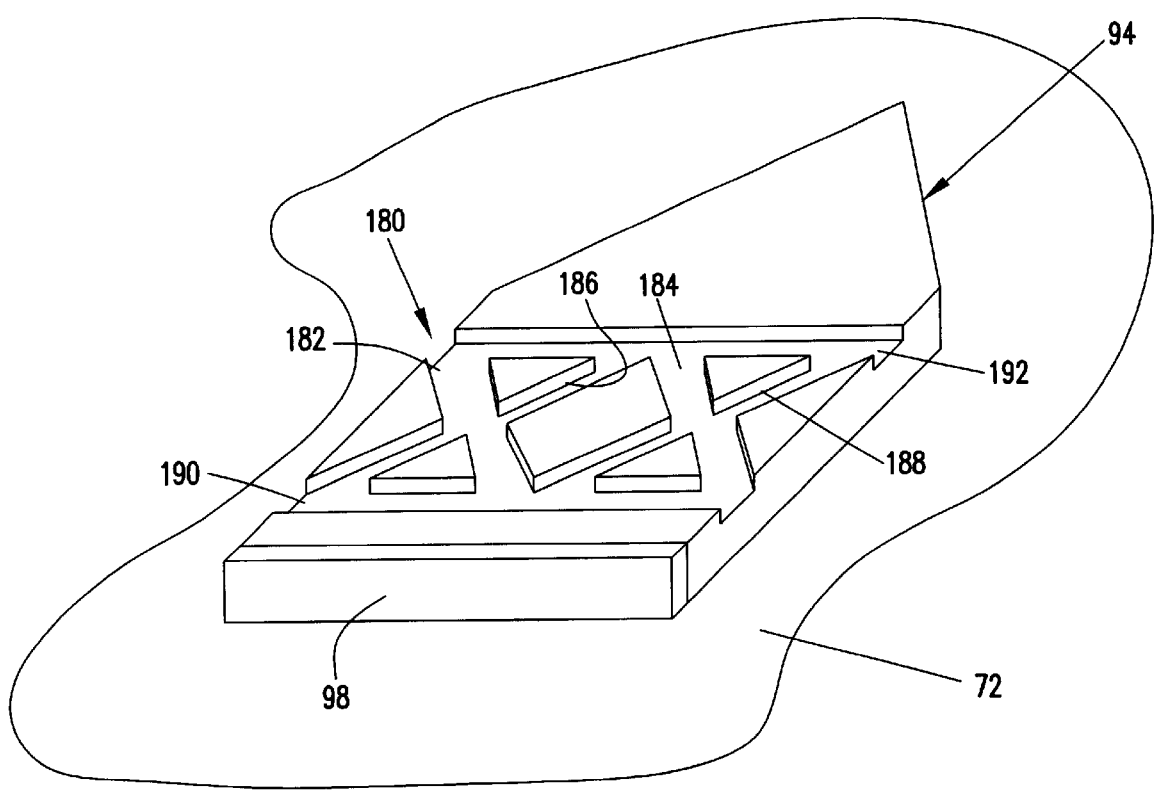
FIG. 16 is a detailed perspective illustration of an alternate embodiment trench pattern of the present invention.

FIG. 16 illustrates alternate trench pattern 180 including a plurality of alternately sloped trenches 182, 184 and 186, 188, which are sloped relative to the longitudinal and transverse axis of the slider. Sloped trenches 182, 186 and 184 and 188 intersect to form a cross pattern. Transverse trenches 190, 192 are included at the ends of the sloped trenches 182, 184, 186 and 188. Transverse trenches 190, 192 extend between sides 132, 134 of center rail 94. Sloped trenches 182, 184, 186 and 188 are opened to transverse trenches 190, 192. Although a particular embodiment of sloped trenches is shown, it should be understood that the invention is not limited to the specific embodiment shown and is not limited to the center rail 94.

The present invention is not limited to non-contacting recording and may be used for pseudo-contact recording as illustrated in FIG. 17 where the slider may intermittently contact the disc surface during operation. FIG. 17 illustrates an embodiment of a slider 200 for pseudo-contact recording. Like numbers are used to identify like parts to slider 72 As shown, the slider 200 is formed of a rigid member and includes shortened side rails 90-1, 92-1 and center rail 94. Ends of shortened side rails 90-1, 92-1 are spaced from the trailing edge 82. Side rails 90-1, 90-2 support pads 100a proximate to the leading edge and thus the trailing edge may intermittently contact the disc surface during operation. To reduce stiction, a trench pattern 130, 150, 160, 170 or 180 (only trench 130 shown) may be formed in center rail 94 proximate to the contact interface to limit growth of meniscus.

A slider for supporting transducer elements for a data storage system comprising: a rigid member including opposed leading and trailing edges and opposed upper and lower surfaces, the lower surface including a raised bearing, a trailing edge surface being adapted to support a transducer element; landing pads extending from the raised bearing and adapted to define a contact interface with a disc surface; and at least one pressure relief trench formed in the raised bearing proximate to a contact interface position between the trailing edge of the slider and disc surface, the trench being sized to reduce capillary pressure of the meniscus along the disc surface. The slider of above wherein the slider may include a center rail and the center rail includes a pressure relief trench. The slider of above may include a transversely aligned pressure relief trench. The slider of above wherein the transversely aligned pressure relief trench may be opened at opposed ends thereof to form a through channel. The slider of above may include a longitudinally aligned pressure relief trench. The slider of above may include a sloped pressure relief trench. The slider of above wherein the slider may include a plurality of spaced pressure relief trenches. The slider of above wherein the slider may include opposed side rails and the side rails include a pressure relief trench. The slider of above wherein the longitudinally aligned pressure relief trench may include an opened end. The slider of above wherein the trench may include a depth dimension sized so that separation of the slider and disc at the trench during contact of the slider with the disc surface is equal to or greater than $2R_e$ to balance capillary pressure and disjoining pressure of a lubricant fluid on the disc surface. The slider of above wherein the trench may be sized to provide a slider-disc interface in the toe-dipping regime.

A slider for supporting transducer elements for a data storage system comprising: a rigid member including opposed leading and trailing edges and opposed upper and lower surfaces, the lower surface including raised bearing surfaces, the trailing edge being adapted to support a transducer element; landing pads extending from a bearing surface and adapted to define a contact interface with a disc surface; and pressure relief means proximate to a contact interface position between the trailing edge of the slider and disc surface to reduce capillary pressure of the meniscus to limit area of the meniscus. The slider of above wherein the pressure relief means may include at least one trench formed in a bearing surface and extending below a bearing surface. The slider of above wherein the trench may include a depth dimension sized so that separation of the slider and disc at the trench during contact of the slider with the disc surface is equal to or greater than $2R_e$ to balance capillary pressure and disjoining pressure of a lubricant fluid on the disc surface. The slider of above wherein the trench may be sized to provide a slider-disc interface in the toe-dipping regime. The slider of above may include a transversely aligned trench. The slider of above may include a longitudinally aligned trench. The slider of above may include a sloped trench. The slider of above wherein the slider may include opposed side rails and the side rails include a trench. The slider of above wherein the slider may include a center rail and the center rail includes a trench.

What is claimed is:
1. A slider for supporting a transducer element for a data storage system comprising:
   a rigid member including opposed leading and trailing edges and opposed upper and lower surfaces, the lower surface including an air bearing surface;
   landing pads extending from the air bearing surface and spaced from the trailing edge of the rigid member such that the rigid member tilts about an axis defined by the pads to thereby cause the trailing edge to approach a disc surface; and at least one pressure relief trench formed in the air bearing proximate to the trailing edge of the rigid member and spaced from the landing pads to reduce capillary pressure and area of a meniscus due to a disc lubricant proximate to the trailing edge of the rigid member caused by tilt of the rigid member.

2. The slider of claim 1 wherein the air bearing surface includes a center rail and the center rail includes a pressure relief trench.

3. The slider of claim 1 wherein the trench is transversely aligned.

4. The slider of claim 1 wherein the trench is opened at opposed ends thereof to form a through channel.

5. The slider of claim 1 wherein the trench is longitudinally aligned.

6. The slider of claim 1 wherein the trench is sloped relative to a plane of the air bearing surface.

7. The slider of claim 1 wherein the air bearing surface includes a plurality of spaced pressure relief trenches.

8. The slider of claim 1 including a center rail.

9. The slider of claim 1 wherein the trench includes a depth dimension sized so that separation of the rigid member and the disc at the trench during contact of the slider with the disc surface is equal to or greater than $2R_e$ to balance capillary pressure and disjoining pressure of a lubricant fluid on the disc surface, where $R_e$ is a radius of a leading edge of a meniscus formed between the disc surface and a capillary surface of the rigid member.

10. The slider of claim 1 wherein the trench is sized to provide a slider-disc interface in the toe-dipping regime in which the landing pads provide an interface with a lubricant on the disc surface.

11. The slider of claim 1 wherein the at least one landing pad is on the rail.

12. The slider of claim 1 including a second raised side rail.

13. The slider of claim 8 including at least one pressure relief trench in the second side rail.

14. A disc storage system including the slider of claim 1.

* * * * *

UNITED STATES PATENT AND TRADEMARK OFFICE
Certificate

Patent No. 6,445,543 B1

Patented: September 3, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jing Gui, Fremont, CA (US); Bruno Jean Marchon, Palo Alto, CA (US); Huan Tang, Los Altos, CA (US); Zine-Eddine Boutaghou, Vadnais Heights, MN (US); and Scott E. Ryun, Prior Lake, MN (US).

Signed and Sealed this Fourth Day of July 2006.

HOA NGUYEN
*Supervisory Patent Examiner*
Art Unit 2652